Aug. 25, 1959     J. F. MARSDEN, JR     2,901,024
METHOD OF MAKING HOSE

Filed Aug. 15, 1957     3 Sheets-Sheet 1

INVENTOR.
John F. Marsden, Jr.
BY
Johnson and Kline
ATTORNEYS

Aug. 25, 1959  J. F. MARSDEN, JR  2,901,024
METHOD OF MAKING HOSE
Filed Aug. 15, 1957  3 Sheets-Sheet 2

INVENTOR.
John F. Marsden, Jr.
BY
Johnson and Kline
ATTORNEYS

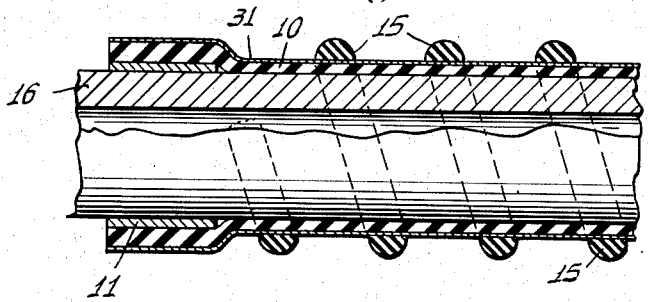
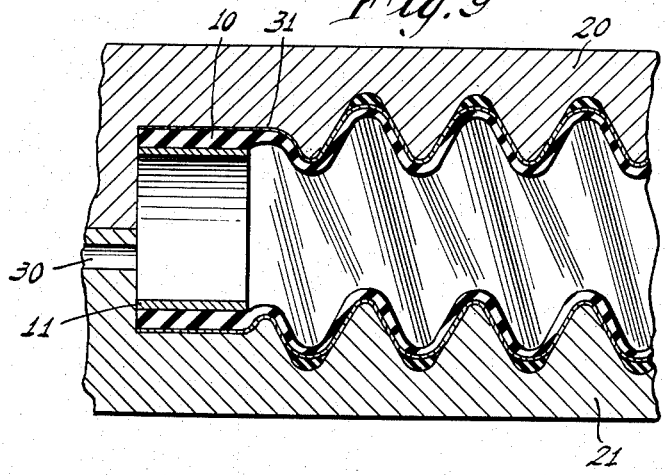
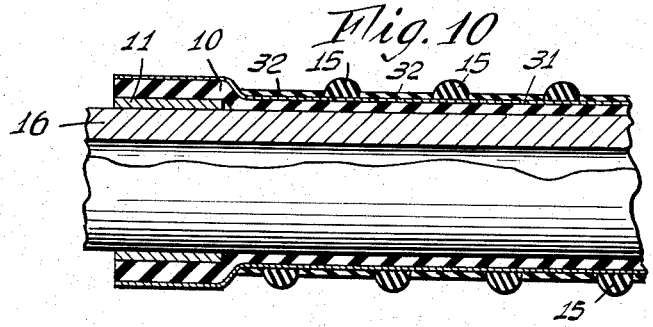
INVENTOR.
John F. Marsden, Jr.
BY
Johnson and Kline
ATTORNEYS

United States Patent Office 2,901,024
Patented Aug. 25, 1959

2,901,024

METHOD OF MAKING HOSE

John F. Marsden, Jr., Malone, N.Y., assignor to Fred T. Roberts and Robert E. Roberts, both of Wilton, Conn.

Application August 15, 1957, Serial No. 678,277

10 Claims. (Cl. 154—8)

This invention relates to a method of making a flexible tubing such, for example, as that adapted for use as a radiator connection for motor vehicles.

Heretofore, one form of flexible tubing has embodied a wall of rubber, or similar material, which has been corrugated and strengthened by means of a wire reenforcement arranged helically upon the corrugations. The wire has usually been applied in the form of a stretched coil which has necessitated some form of connection between it and the tube for maintaining the reenforcement turns in proper position with respect to the tube. The wire, however, is subject to deterioration by rust.

An object of the present invention is to provide a method of constructing a flexible tube which is suitable, among other things, for use as a radiator connection and which will possess the strength and flexibility incident to the use of a wire spring as a reenforcement without necessitating the use of metal for the reenforcing medium.

This application is a continuation-in-part of my application Serial No. 427,185, filed May 3, 1954.

Briefly the invention comprises the forming of a tubular body of moldable elastic material such as rubber, or rubber-like material, which has a reenforcement, also of similar moldable elastic material such as rubber or rubber-like material, disposed on the exterior surface thereof, and arranged in turns either of spaced annular rings or spirally upon the tube. The reenforcement preferably has a hardness in excess of the hardness of the material of which the tube is made, and may embody a strip of material which is half-round in cross section. After the reenforcement is applied to the tube, the assembly may be vulcanized in a mold, and, during such vulcanization, the body of the tube may be formed either with a smooth cylindrical inner surface and a corrugated outer surface, formed by the reenforcement turns, or with a corrugated inner and a corrugated outer surface. In the latter form, the reenforcement turns may be embedded, either in the troughs of the corrugations, or in the crests of the corrugations, or in both, whichever may be desired. Preferably, during vulcanization, internal pneumatic pressure is used to force the tube against the mold surface.

In the drawings:

Fig. 8 is a view of the assembled body and reenforcement before molding.

Fig. 9 is a view of the hose of Fig. 8 molded into final shape.

Fig. 10 is a view similar to Fig. 8 showing another form of body assembly.

Figure 1:
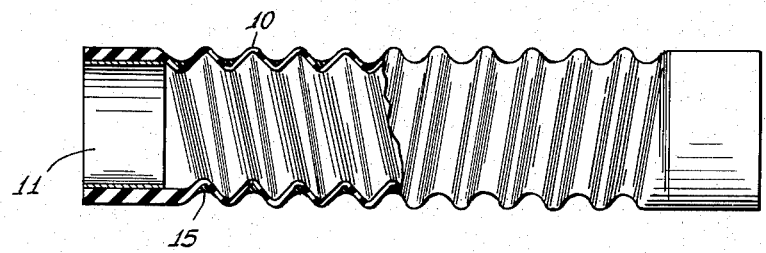
Figure 1 is a front elevation of a hose, partly in section, made in accordance with the present invention.

In accordance with the method of the present invention a hose may be formed which has reenforcement turns affixed to the exterior surface thereof. While the body of the hose may comprise one or more layers of moldable elastic material such as rubber, or rubber-like material, in the drawings I have illustrated various forms of the hose as having only one layer of rubber-like material, designated 10. Each end of the hose may be formed around a rigid tubular insert 11, preferably of metal, which, after the setting or vulcanization of the hose, is removed so as to insure smoothness in the ends of the hose and uniformity in diameter.

Figure 2:
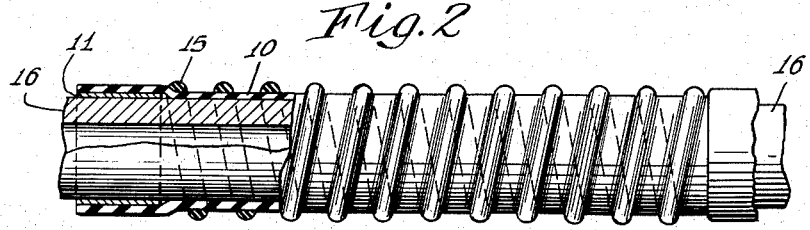
Fig. 2 is a front elevation partly in section of the hose being formed upon a hollow mandrel.

I have shown various modifications of the hose made by the method of the present invention but, in general, Fig. 2 illustrates the formation of the hose by the use of an external reenforcement, which in this illustration comprises a long continuous strip 15 of flexible non-metallic material, such as rubber, or a polymeric material which, when vulcanized, has a hardness exceeding that of the material of which the layer 10 is made. The hose is shown as being formed upon a hollow mandrel 16 and the reenforcement is indicated as being substantially half-round in cross-section and as being wound helically upon the outer surface of the tube.

Figure 3:
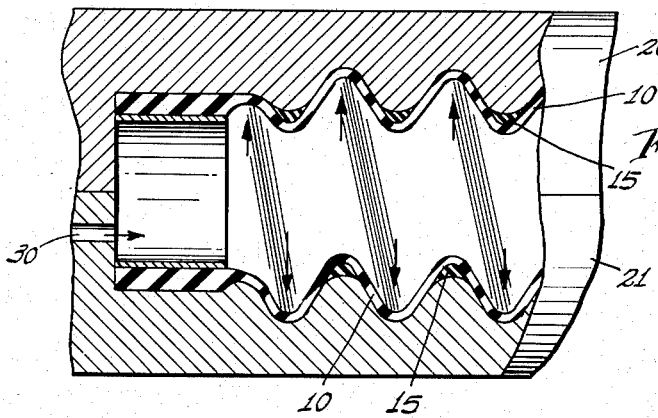
Fig. 3 is a fragmentary view, partly in section, of a sectional mold and illustrating a forming operation during vulcanization.

After the tube is removed from the mandrel, it is then placed in a vulcanizing mold shown, for example, in Fig. 3 by the sections 20 and 21, the cavities of which are shaped to produce the desired exterior formation on the hose. Thus, for example, if it is desired to form a hose which has a corrugated inner and outer wall with the reenforcement turns disposed in the troughs of the corrugations, then the formation of the cavities would be as shown in Fig. 3 in which the crests and troughs each form arcs of predetermined radii throughout the length of the hose. However, if desired, the cavities could be shaped to form a hose which has a cylindrical inner wall, as shown in Fig. 2, with a corrugated outer surface, formed by the reenforcement strip 15.

Figure 4:
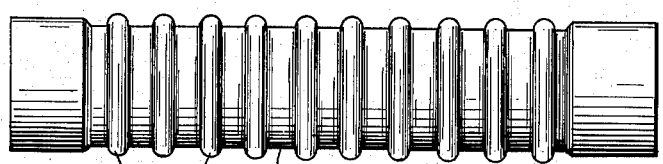
Fig. 4 is a front elevation of a hose having the construction illustrated in Fig. 2, but with the reenforcement turns in the form of annular rings.

The form of hose shown in Fig. 2 is illustrated in Fig. 4, but in Fig. 4 the reenforcement turns 15A comprise annular rings. The inner wall, however, is substantially cylindrical, as is shown in Fig. 2. In vulcanizing this form of hose, as in the form shown in Fig. 3, the internal pressure for forcing the tube against the mold surface may be supplied by air through a conduit indicated at 30 in the section 21, or by any other well known means.

Figure 5:
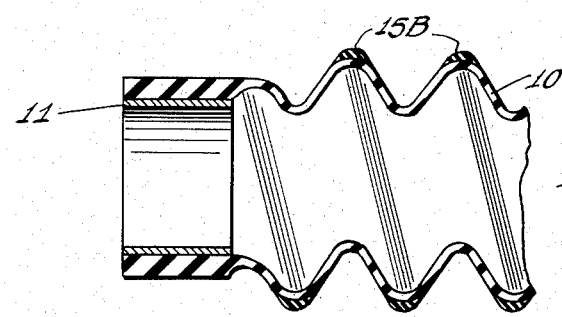
Figs. 5 and 6 are fragmentary sectional views of modifications of the invention.
Figure 6:
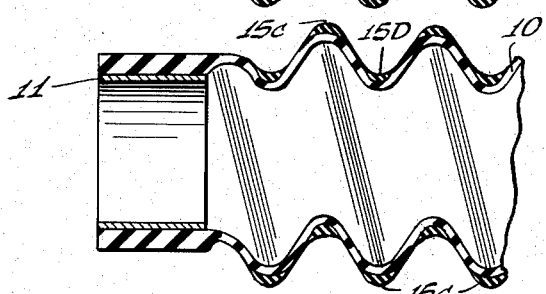

In Figs. 1 and 3 the hose is corrugated on the inner and outer surfaces, and the reenforcement turns are disposed within the troughs of the corrugations. A modification, however, is shown in Fig. 5, wherein the reenforcement turns 15B are disposed on the crests of the corrugations. In Fig. 6 the turns 15C are positioned on the crests while the turns 15D are positioned in the troughs of the corrugations.

Figure 7:
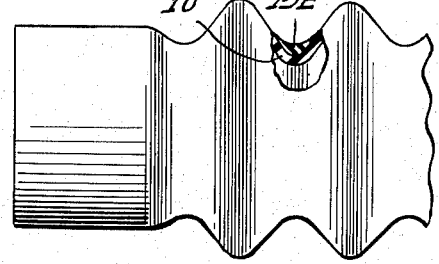
Fig. 7 is a fragmentary view of a portion of a hose having a construction of either Figs. 3, 5 and 6, but having reenforcement turns in the form of annular rings.

The hose illustrated in Fig. 7 has a corrugated outer and inner wall, but the reenforcement turns 15E are annular rings. In this form of the invention the reenforcement turns can be positioned in the troughs, or on the crests, or can be disposed in both the troughs and crests, as desired. Fig. 7 shows a portion of the hose broken away to illustrate a reenforcement turn 15E in a trough of the corrugations.

The material of which the reenforcement turns is made may be either semi-cured or may be a raw stock, either of which will mold in situ and will set or cure during vulcanization to a higher degree of shore measurement—indicating a harder substance—than the material of which the body of the tube is made.

Further, when the preformed half-round or semi-cylindrical reenforcements are molded in situ by the corrugated mold cavity, they produce a reenforcement which decreases in thickness and tapers outwardly from the center to the edge thereof as is clearly shown at 15 in Fig. 3. This gradual thickening of the reenforcement prevents a fixed flexing point in the wall at the edge of the reenforcement as the hose is stretched and the corrugations flatten out which would tend to cause a failure in the hose.

While moldable elastic material such as rubber or rubber-like material is the preferred material for the tube and is very satisfactory in use with my non-metallic reenforcement, for tubes wherein great strength is not required, I prefer to strengthen the tube with fabric, rather than to thicken the material of the tube to a greater thickness, when greater strength is required. This is for the reason that too thick at tube will greatly affect the flexibility of the hose when in use, because flexibility is gained by the flexing between the reenforcements, and because strength in such regions without excessive thickness is desirable.

One form of such a hose is shown in Figs. 8 and 9 in which a body 10 of moldable elastic material is formed into a tube and is provided on its outer surface with a layer 31 of stockinette, braid or other open weave or mesh fabric which may or may not be impregnated with moldable elastic material. Preferably, the fabric is formed as a tubular member and applied over the tube of moldable elastic material. The preformed reenforcing strip 15 of moldable material is then wound or otherwise supplied in predetermined spaced relation on the fabric-covered tube. The tube with the reenforcing member assembled thereon is then inserted in the cavity of the mold as described in connection with Fig. 3 and fluid pressure applied to the interior of the body to force it out against the walls of the mold. This not only causes the body to assume the shape of the walls of the cavity in the mold and to mold the reenforcement in situ, as shown, but also causes the elastic material to be forced outwardly through the mesh of the fabric and into engagement with the walls of the mold to provide a smooth, molded outer surface with the fabric reenforcement interlocked with the body of the hose.

Under some circumstances, in order to insure full coverage of the fabric, a layer 32 of moldable elastic covering material similar to the body can be applied between the strips of reenforcement material, as shown in Fig. 10 so that when the hose body is forced into engagement with the mold a smooth, continuous outer surface of elastic material is provided.

The use of reenforcement positioned upon the exterior surface of the hose enables the hose to be made in a simple and expeditious manner. Inasmuch as the reenforcement is harder than the body of the tube and can be spaced either in annular or in spiral turns, it is possible to shape the hose in a vulcanizing press so that it has a smooth, cylindrical inner surface with a corrugated outer surface, or a corrugated inner and outer surface, as desired.

Variations and modifications may be made within the scope of the claims and portions of the improvements may be used without others.

I claim:

1. The method of making a reenforced hose comprising forming a tubular body of moldable elastic material, preforming a strip of moldable reenforcing material similar to, but harder than the material of said body, applying said preformed reenforcing strip to the exterior of the body at predetermined spaced points along said body, inserting said body into a mold cavity having corrugated walls with said strip disposed in predetermined position with respect to the corrugated walls, applying fluid pressure to the interior of said body to cause the body and reenforcing strip to be pressed into engagement with the corrugated walls of the cavity to form a hose with corrugated walls, with the reenforcing strip being integrated with the wall and being molded in situ in the mold to blend into and form the outer surface of the corrugated wall.

2. The method of making a reenforced hose comprising the steps of preforming a half-round strip of moldable elastic reenforcing material, applying said preformed reenforcing strip to the exterior of a tubular body of moldable elastic material at predetermined spaced points along said body with the flat side of the half-round strip in engagement with the body, inserting said body having the reenforcing strip thereon into a mold cavity having corrugated walls with said strip disposed in predetermined position with respect to the corrugated walls, applying fluid pressure to the interior of said body to cause the body and reenforcing strip to be pressed into engagement with the corrugated walls of the cavity to be molded thereby and form a hose with corrugated walls, with the reenforcing strip being integrated with the wall and being molded in situ in the mold to blend into and form the outer surface of the corrugated wall, and setting the hose in the molded shape, the material of said reenforcing strip, upon setting, being harder than the material of the body to provide reenforcement for the hose.

3. The method of making a reenforced hose comprising forming a tubular body of moldable elastic material, preforming a strip of moldable reenforcing material similar to, but harder than the material of said body with a substantially half-round cross-section, applying said preformed reenforcing strip to the exterior of the body at predetermined spaced points along said body, inserting said body into a mold cavity having corrugated walls with said strip disposed in predetermined position with respect to the corrugated walls, applying fluid pressure to the interior of said body to cause the body and reenforcing strip to be pressed into engagement with the corrugated walls of the cavity to form a hose with corrugated walls, with the reenforcing strip uniformly decreasing in thickness from the center thereof and being integrated with the hose wall and molded in situ in the mold to blend into and form the outer surface of the corrugated wall.

4. The method of making a reenforced hose comprising forming a tubular body of moldable elastic material, preforming a strip of moldable reenforcing material similar to, but harder than the material of said body, applying said preformed reenforcing strip to the exterior of the body at predetermined spaced points along said body, inserting said body into a mold cavity having corrugated walls with said strip disposed in position with respect to the corrugated walls of the mold to form the troughs and crests in the corrugated hose, applying fluid pressure to the interior of said body to cause the body and reenforcing strip to be pressed into engagement with the corrugated walls of the cavity to form a hose with corrugated walls, with the reenforcing strip located in the troughs and crests of the corrugations in the hose and being integrated with the hose wall and molded in situ in the mold to blend into and form the outer surface of the hose.

5. The method of making a reenforced hose comprising forming a tubular body of moldable elastic material, preforming a strip of moldable reenforcing material similar to, but harder than the material of said body, applying said preformed reenforcing strip to the exterior of the body at predetermined spaced points along said body, inserting said body into a mold cavity having corrugated walls with said strip disposed in position with respect to the corrugated walls of the mold to form the troughs in the corrugated hose, applying fluid pressure to the interior of said body to cause the body and reenforcing strip to be pressed into engagement with the corrugated walls of the cavity to form a hose with corrugated walls, with the reenforcing strip located in the troughs of the corrugations in the hose and being integrated with the hose wall and molded in situ in the mold to blend into and form the outer surface of the hose.

6. The method of making a reenforced hose comprising forming a tubular body of moldable elastic material, preforming a strip of moldable reenforcing material similar to, but harder than the material of said body, applying said preformed reeinforcing strip to the exterior of the body at predetermined spaced points along said body, inserting said body into a mold cavity having corrugated walls with said strip disposed in posiiton with respect to the corrugated walls of the mold to form the crests in the corrugated hose, applying fluid pressure to the interior of said body to cause the body and reenforcing strip to be pressed into engagement with the corrugated walls of the cavity to form a hose with corrugated walls, with the reenforcing strip located in the crests of the corrugations in the hose and being integrated with the hose wall and molded in situ in the mold to blend into and form the other surface of the hose.

7. The method of making a reenforced hose comprising forming a tubular body of moldable elastic material, preforming a strip of moldable reenforcing material similar to, but harder than the material of said body, applying said preformed reenforcing strip to the exterior of the body at predetermined spaced points along said body, inserting said body into a mold cavity having helically corrugated walls with said strip disposed in predetermined position with respect to the corrugated walls, applying fluid pressure to the interior of said body to cause the body and reenforcing strip to be pressed into engagement with the corrugated walls of the cavity to form a hose with helically corrugated walls, with the reenforcing strip being integrated with the wall and being molded in situ in the mold to blend into and form the outer surface of the corrugated wall.

8. The method of making a reenforced hose comprising forming a tubular body of moldable elastic material, preforming a strip of moldable reenforcing material similar to, but harder than the material of said body, applying said preformed reenforcing strip to the exterior of the body at predetermined spaced points along said body, inserting said body into a mold cavity having annularly corrugated walls with said strip disposed in predetermined position with respect to the corrugated walls, applying fluid pressure to the interior of said body to cause the body and reenforcing strip to be pressed into engagement with the corrugated walls of the cavity to form a hose with annularly corrugated walls, with the reenforcing strip being integrated with the wall and being molded in situ in the mold to blend into and form the outer surface of the corrugated wall.

9. The method of making a reenforced hose comprising the steps of forming a tubular body of moldable elastic material having a reenforcing layer of open mesh fabric on the exterior of the body, preforming a strip of moldable reenforcing material similar to, but harder than the material of said body, applying said preformed reenforcing strip to the exterior of the body to overlie the fabric at predetermined spaced points along said body, inserting said assembled body into a mold cavity having corrugated walls with said strip disposed in predetermined position with respect to the corrugated walls, applying fluid pressure to the interior of said body to cause the body and reenforcing strip to be pressed into engagement with the corrugated walls of the cavity to form a hose with corrugated walls, with the material of the body being forced through the openings in the fabric and the reenforcing strip being integrated with the wall and being molded in situ in the mold to blend into and form the outer surface of the corrugated wall.

10. The method of making a reenforced hose comprising the steps of forming a tubular body of moldable elastic material having a reenforcing layer of open mesh fabric on the exterior of the body, preforming a strip of moldable reenforcing material similar to, but harder than the material of said body, applying said preformed reenforcing strip to the exterior of the body to overlie the fabric at predetermined spaced points along said body, applying a layer of body material over the layer of fabric between the spaced reenforcing strip, inserting said assembled body into a mold cavity having corrugated walls with said strip disposed in predetermined position with respect to the corrugated walls, applying fluid pressure to the interior of said body to cause the body and reenforcing strip to be pressed into engagement with the walls of the cavity to form a hose with smooth corrugated walls and the reenforcing strip being integrated with the wall and being molded in situ to blend into the outer surface of the wall.

References Cited in the file of this patent

UNITED STATES PATENTS

| | | |
|---|---|---|
| 2,073,335 | Connell | Mar. 9, 1937 |
| 2,248,898 | Ross et al. | July 8, 1941 |
| 2,371,991 | Harding | Mar. 20, 1945 |
| 2,641,302 | Martin et al. | June 9, 1953 |
| 2,706,833 | Doherty | Apr. 26, 1955 |
| 2,763,316 | Stahl | Sept. 18, 1956 |
| 2,788,804 | Larkin | Apr. 16, 1957 |

FOREIGN PATENTS

| | | |
|---|---|---|
| 761,393 | Great Britain | Nov. 14, 1956 |

UNITED STATES PATENT OFFICE
CERTIFICATE OF CORRECTION

Patent No. 2,901,024                              August 25, 1959

John F. Marsden, Jr.

It is hereby certified that error appears in the printed specification of the above numbered patent requiring correction and that the said Letters Patent should read as corrected below.

Column 3, line 23, for "at tube" read -- a tube --; column 5, line 16, for "posiiton" read -- position --; line 25, for "other" read -- outer --.

Signed and sealed this 8th day of March 1960.

(SEAL)
Attest:

KARL H. AXLINE
Attesting Officer

ROBERT C. WATSON
Commissioner of Patents